H. L. WHITMAN, Jr.
TRACTOR WHEEL.
APPLICATION FILED MAR. 2, 1917.
1,232,635.
Patented July 10, 1917.
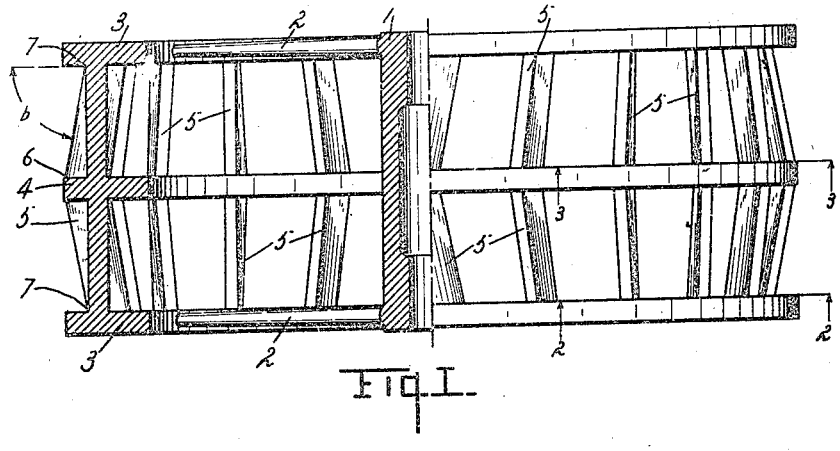
Fig. I.
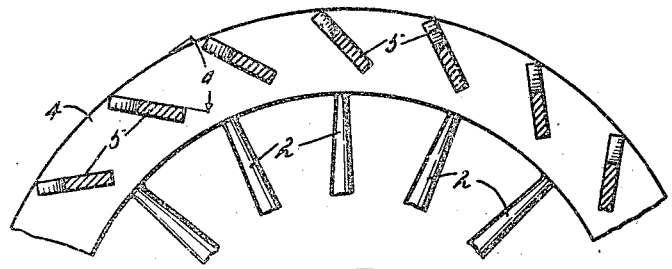
Fig. II.
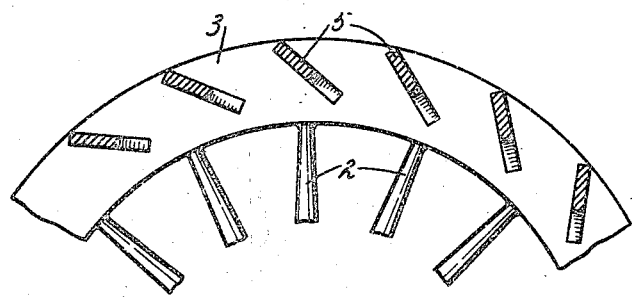
Fig. III.
WITNESSES:
Lem Gilman
Luther Blake
INVENTOR.
Henry L. Whitman Jr.
BY Chappell & Earl
ATTORNEYS.

UNITED STATES PATENT OFFICE.

HENRY L. WHITMAN, JR., OF ST. LOUIS, MISSOURI.

TRACTOR-WHEEL.

1,232,635.　　　　Specification of Letters Patent.　　Patented July 10, 1917.

Application filed March 2, 1917. Serial No. 152,056.

*To all whom it may concern:*

Be it known that I, HENRY L. WHITMAN, Jr., a citizen of the United States, residing at St. Louis, Missouri, have invented certain new and useful Improvements in Tractor-Wheels, of which the following is a specification.

This invention relates to improvements in tractor wheels.

The main objects of this invention are:

First, to provide an improved tractor wheel which has good traction on soft and also on slippery surfaces.

Second, to provide an improved tractor wheel which is not likely to bury itself in soft soil or to load up with the soil.

Further objects and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a plan view of my improved tractor wheel, partially in section to better illustrate structural details.

Fig. II is an enlarged detail section taken on a line corresponding to line 2—2 of Fig. I.

Fig. III is an enlarged detail section taken on a line corresponding to line 3—3 of Fig. I, portions of the wheel being broken away.

In the drawings, similar reference characters refer to similar parts throughout the several views, and the sectional views are taken looking in the direction of the little arrows at the ends of the section lines.

Referring to the drawing, my improved tractor wheel as there shown is formed integrally and consists of a hub 1 having spokes 2 radiating therefrom at each end and connected to the outer annular rim members 3. The intermediate rim member 4 is centrally positioned between the outer rim members and connected thereto by the tread members 5. These tread members are flat and of substantial width and are disposed in a substantially spaced relation between the rim members 3 with the outer edge at the inner end thereof substantially flush with the outer edge of the intermediate rim, as shown in Fig. I.

The sides of the tread members are perpendicular to the plane of the rim members but the edges thereof are inclined inwardly from the intermediate rim so that the outer end of the outer edge of each tread member is spaced from the edge of the outer rim members, as indicated at 7, in Fig. I.

As stated above, the sides of the tread members are perpendicular to the planes of the rim members. Each tread member is set at an angle $a$ of substantially 45° with a tangent to the rim member drawn through the point of intersection of the side of the rim member and the edge of the intermediate rim or the point of intersection of the side extended and one of the outer rims. The edges of the tread members make an angle $b$ of substantially 70° with the outer and intermediate rim members. These angles may be varied somewhat to adapt the wheel to operate satisfactorily in different kinds of soil.

In use, when the tractor is traveling upon a hard surface only the edges of the rim members come in contact therewith, but in soft soil the rim members sink in until the tread members furnish the necessary support and traction for the tractor.

It will be noted from inspection of Fig. III that the lower sides of the tread members tend to pack the dirt downwardly and thereby to raise the tractor and prevent it from sinking farther.

By inclining the outer edge of the tread members inwardly from the intermediate rim, the portions of the outer rim, which extend beyond the outer edges of the tread members, provide means for preventing lateral slipping of the tractor wheels.

My invention is not necessarily restricted to a wheel having an intermediate rim, that is, to a double wheel, but may be embodied in a wheel comprising but two outer rims having the tread members secured thereto in the same manner in which they are secured to the intermediate rim and the outer rims in the embodiment described above.

It will be clear that, since in traveling upon hard surfaces, the weight of the tractor is carried by the edges of the rim members there will be no tendency of the tread members to dig up the surface of the road.

Having thus described my invention, what

I claim as new and desire to secure by Letters Patent is:

1. A tractor wheel comprising a hub, spaced outer and central rim members, spokes connecting the outer rim members with the hub, and blade-like tread members, said hub, rim members, spokes and tread members being integral, said tread members being disposed in a substantially spaced relation, the outer edges of said tread members being inclined inwardly from the edge of the central rim member to the outer rim member whereby the outer ends of the outer edges of said tread members are spaced inwardly from the edges of said outer rim members, the sides of said tread members being set at substantial angles with tangents drawn through the outer edges of said tread members at their points of intersection with the edges of said rim members, substantially as described.

2. A tractor wheel comprising spaced outer and central rim members, and blade-like tread members, said tread members being disposed in a substantially spaced relation, the outer edges of said tread members being inclined inwardly from the edge of the central rim member to the outer rim members whereby the outer ends of the outer edges of said tread members are spaced inwardly from the edges of said outer rim members, the sides of said tread members being set at substantial angles with tangents drawn through the outer edges of said tread members at their points of intersection with the edges of said rim members, substantially as described.

3. A tractor wheel comprising spaced outer and central rim members, and blade-like tread members, said tread members being disposed in a substantially spaced relation, the outer edges of said tread members being inclined inwardly from the edge of the central rim members to the outer rim member whereby the outer ends of the outer edges of said tread members are spaced inwardly from the edges of said outer rim members, substantially as described.

4. A tractor wheel comprising a hub, spaced rim members, flat tread members disposed in a substantially spaced relation between said rim members, the sides of said tread members being perpendicular to the planes of said rim members, the outer edges of said tread members being within the outer edges of the rim member and inclined relative to said rim members, the sides of said tread members making substantial angles with the tangents drawn through the point of intersection thereof with the edge of said rim members, substantially as described.

In witness whereof, I have hereunto set my hand and seal in the presence of two witnesses.

HENRY L. WHITMAN, Jr. [L. S.]

Witnesses:
G. R. THREADCRAFT,
C. F. BEYER.